(12) United States Patent
Yoshiba et al.

(10) Patent No.: US 8,740,516 B2
(45) Date of Patent: Jun. 3, 2014

(54) CUTTING INSERT FOR THREADING

(71) Applicant: Tungaloy Corporation, Iwaki (JP)

(72) Inventors: Daisuke Yoshiba, Iwaki (JP); Eiichi Nunokawa, Iwaki (JP)

(73) Assignee: Tungaloy Corporation, Fukushima (JP)

( * ) Notice: Subject to any disclaimer, the term of this patent is extended or adjusted under 35 U.S.C. 154(b) by 0 days.

(21) Appl. No.: 13/717,053

(22) Filed: Dec. 17, 2012

(65) Prior Publication Data

US 2013/0108384 A1    May 2, 2013

Related U.S. Application Data

(63) Continuation-in-part of application No. PCT/JP2011/063982, filed on Jun. 17, 2011.

(30) Foreign Application Priority Data

Jun. 17, 2010 (JP) ................................ 2010-138211

(51) Int. Cl.
*B23G 5/00* (2006.01)

(52) U.S. Cl.
USPC .............................. 408/220; 407/113; 470/66

(58) Field of Classification Search
CPC .............. B23G 5/00; B23G 5/08; B23G 5/10; B23G 5/14
USPC .......... 408/215, 217, 219, 220, 222; 407/113, 407/66–112; 409/69; 470/10, 66, 80, 185, 470/187, 188
See application file for complete search history.

(56) References Cited

U.S. PATENT DOCUMENTS 5,059,069 A * 10/1991 Lagerberg ..................... 407/113
5,549,425 A    8/1996 Bernadic et al.
(Continued)

FOREIGN PATENT DOCUMENTS

JP    H01-106102    7/1989
JP    H09-272104 A  10/1997
(Continued)

OTHER PUBLICATIONS

International Search Report dated Aug. 16, 2011 issued in PCT counterpart application (No. PCT/JP2011/063982).

(Continued)

*Primary Examiner* — Daniel Howell
*Assistant Examiner* — Ryan Rufo
(74) *Attorney, Agent, or Firm* — Womble Carlyle Sandridge & Rice, LLP (57) ABSTRACT

A threading cutting insert achieves high shape accuracy of a screw to be processed, and saves on manufacturing cost. Therefore in the threading cutting insert, a plurality of tooth-shaped cutting edges are formed in a cross ridge line portion between a rake face and flanks formed in a cutting side face, wherein the plurality of mountain-shaped cutting edges provides at least one finishing cutting edge for transferring a shape of a screw, and at least one roughing cutting edge formed in a tooth shape smaller than that of the finishing cutting edge. A flank of the finishing cutting edge includes a first flank, and a second flank having a clearance angle larger than that of the first flank, wherein the finishing cutting edge, the first flank, and the second flank are sequentially provided in that order from the rake surface in a direction of a lower surface of the insert.

3 Claims, 6 Drawing Sheets

(56) References Cited

U.S. PATENT DOCUMENTS

| | | | |
|---|---|---|---|
| 6,224,299 B1 | 5/2001 | Frecska et al. | |
| 6,957,933 B2 | 10/2005 | Pachao-Morbitzer et al. | |
| 2004/0109733 A1* | 6/2004 | Fouquer | 407/113 |
| 2006/0072975 A1* | 4/2006 | Giessler et al. | 408/222 |
| 2012/0321400 A1* | 12/2012 | Weisel et al. | 407/113 |

FOREIGN PATENT DOCUMENTS

| | | | | |
|---|---|---|---|---|
| JP | 11-207524 A | * | 8/1999 | B23G 5/00 |
| JP | 2006-130579 A | * | 5/2006 | B23G 5/00 |
| JP | 2007-130719 A | | 5/2007 | |
| JP | 2007-313590 A | | 12/2007 | |

OTHER PUBLICATIONS

International Preliminary Report on Patentability (IPRP) dated Jan. 3, 2013 issued in PCT counterpart application (No. PCT/JP2011/063982) with translation.

Official action dated Nov. 26, 2013 issued in Japanese counterpart application (No. 2012-520514) with English translation.

* cited by examiner

CUTTING INSERT FOR THREADING

CROSS-REFERENCE TO RELATED APPLICATIONS

This application is a Continuation-in-part of International Application No. PCT/JP2011/063982 filed Jun. 17, 2011 and published as WO 2011/158946A1 on Dec. 22, 2011, which claims the benefit of Japanese Patent Application No. 2010-138211, filed Jun. 17, 2010. The contents of the aforementioned applications are incorporated by reference herein in their entirety.

BACKGROUND OF THE INVENTION

1. Field of the Invention

The present invention relates to a cutting insert used for threading work.

2. Description of the Related Art

In a screw cutting edge of a cutting insert for pipe threading work called a chaser among cutting inserts for threading work, a plurality of tooth-shaped convex cutting edges are arranged substantially in parallel by predetermined intervals. It is general that the predetermined interval herein is defined as an interval equal to a pitch of a screw to be processed.

In the cutting insert for threading work, for preventing degradation of shape accuracy of the screw to be processed, it is general to form a ridge line and flanks of the cutting edge by grinding work using a grinding stone. In a screw cutting edge in this cutting insert for threading work, a length in a direction along the cutting edge is long, and a contour shape of the cutting edge is complicated as viewed from a rake face side. Therefore there is a problem that the time required for grinding work is long.

For overcoming the above problem, for example, a cutting insert disclosed in Japanese Patent Laid-Open No. 2007-313590 is proposed. According to this cutting insert, when the cutting insert for threading work performs threading work, at least one of the cutting edges in a front side of a relative feeding direction is defined as a roughing cutting edge, at least one of the cutting edges in a back side of the relative feeding direction is defined as a finishing cutting edge, wherein a height of a tooth of the roughing cutting edge relative to an internal reference line parallel to a relative feeding direction of the insert is lower than that of a tooth of the finishing cutting edge. In a case where the tooth shape of the roughing cutting edge and the tooth shape of the finishing cutting edge overlap, the roughing cutting edge is formed to be smaller in such a manner that the roughing cutting edge is accommodated in a footprint of the finishing cutting edge, and a surface roughness of the flank in the roughing cutting edge is rougher than that of the flank in the finishing cutting edge. This structure enables the time in the grinding process of the cutting edge to be shortened and manufacturing costs of the cutting edge to be suppressed, and further, screw cutting work to be realized with high accuracy as conventional.

SUMMARY OF THE INVENTION

For realizing the lower costs, however, the cutting insert for threading work disclosed in Japanese Patent Laid-Open No. 2007-313590 has a limitation to the realization.

The present invention is made for solving this problem, and provides a cutting insert for threading work which can reduce manufacturing costs to be lower, without degradation in shape accuracy of a screw to be processed.

The threading cutting insert has a rake face 2 formed on an upper face, flanks as a cutting side face 14 formed between the upper face and a lower face opposing the upper face, and a plurality of tooth-shaped cutting edges formed in a cross ridge line portion between the rake face 2 and the flanks as viewed from an upper side of the rake face 2. The cutting edge comprises at least one finishing cutting edge 6a for transferring a shape of a screw, and at least one roughing cutting edge 6b formed in a tooth shape smaller than that of the finishing cutting edge 6a as viewed from an upper side of the rake face 2. A flank 4a of the finishing cutting edge 6a includes a first flank 5a, and a second flank 5b having a clearance angle larger than that of the first flank 5a as viewed in a row direction R of the cutting edge, wherein the finishing cutting edge 6a, the first flank 5a, and the second flank 5b are sequentially provided in that order from the rake face 2 towards the lower face.

According to the present invention, the second flank 5b is provided to be sequentially connected to the first flank 5a to be spaced from a cross ridge line portion defined between the finishing cutting edge 6a and the rake face 2, as viewed in a row direction of the cross ridge line portion (i.e., as viewed along thickness direction of the cutting insert for threading work). Accordingly, even if the surface roughness of the second flank 5b is rough or is low in shape accuracy, it does not have an adverse influence on the shape accuracy of the finishing cutting edge 6a. According to the present invention, providing the second flank 5b enables the time for grinding the first flank 5a to become short and manufacturing costs of the cutting insert for threading work to be reduced. In addition, loads of the grinding stone can be reduced and a lifetime of the grinding stone for grinding the first flank 5a can be extended. Further, because of reduced wear of the grinding stone, the shape accuracy of the cutting edge ridge line in the finishing cutting edge 6a can be enhanced.

Further features of the present invention will become apparent from the following description of exemplary embodiments (with reference to the attached drawings).

DETAILED DESCRIPTION

Figure 1:
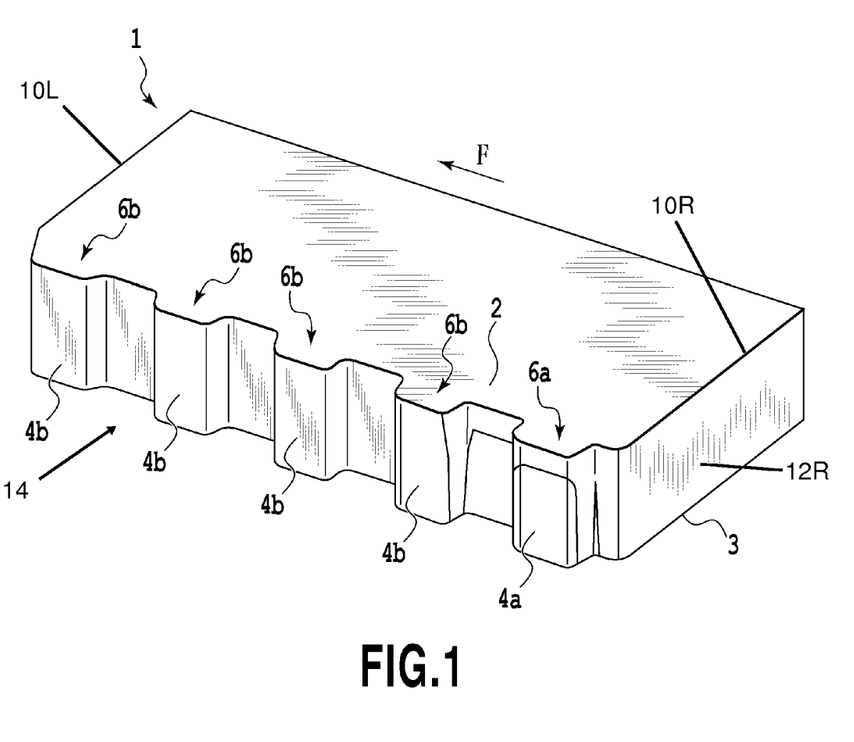
FIG. 1 is a perspective view of a cutting insert for threading work according to an embodiment in the present invention.
Figure 2:
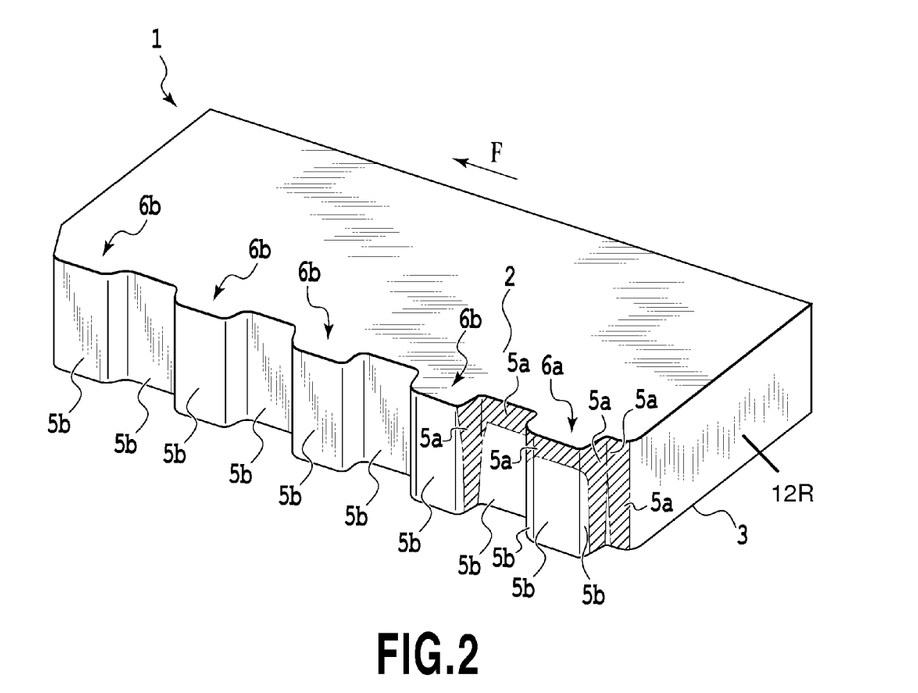
FIG. 2 is a perspective view showing a first flank of the cutting insert shown in FIG. 1 with a hatched line portion.

An explanation will be made of an embodiment in the present invention with reference to the drawings. FIG. 1 is a perspective view of a cutting insert for threading work according to the embodiment in the present invention. FIG. 2 is a perspective view showing a first flank of the cutting insert for threading work shown in FIG. 1 with a hatched line portion.

Figure 3:
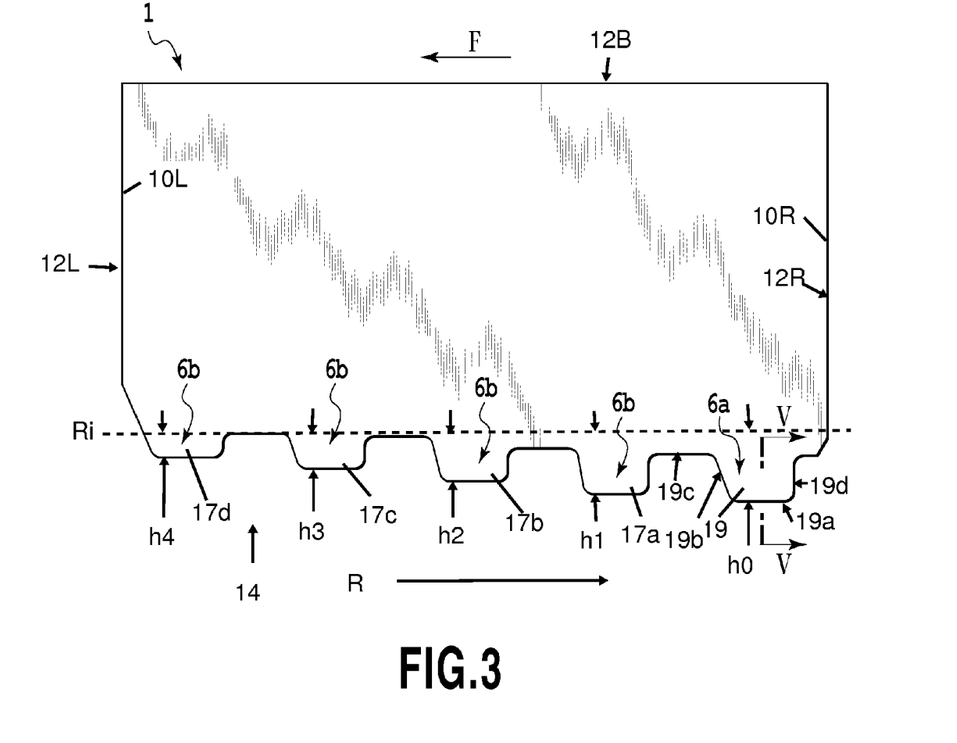
FIG. 3 is a plan view showing the cutting insert shown in FIG. 1 as viewed from an upper face side.
Figure 4:
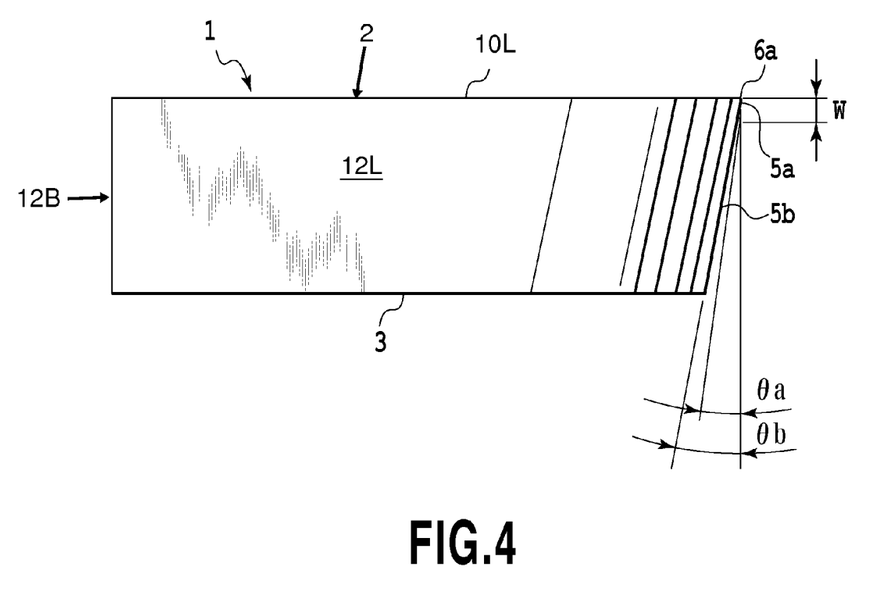
FIG. 4 is a left side view showing the cutting insert shown in FIG. 1 as viewed from a left side.
Figure 5:
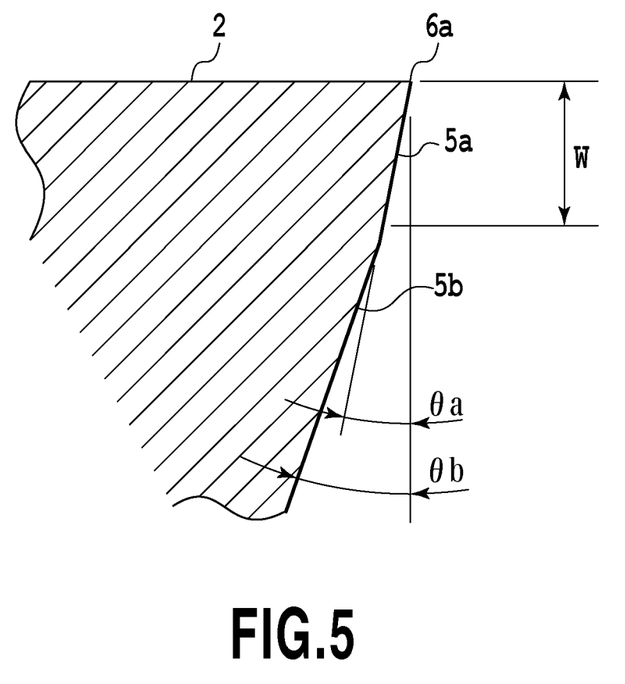
FIG. 5 is an enlarged view of a cross section of lines V-V in FIG. 3.
Figure 6:
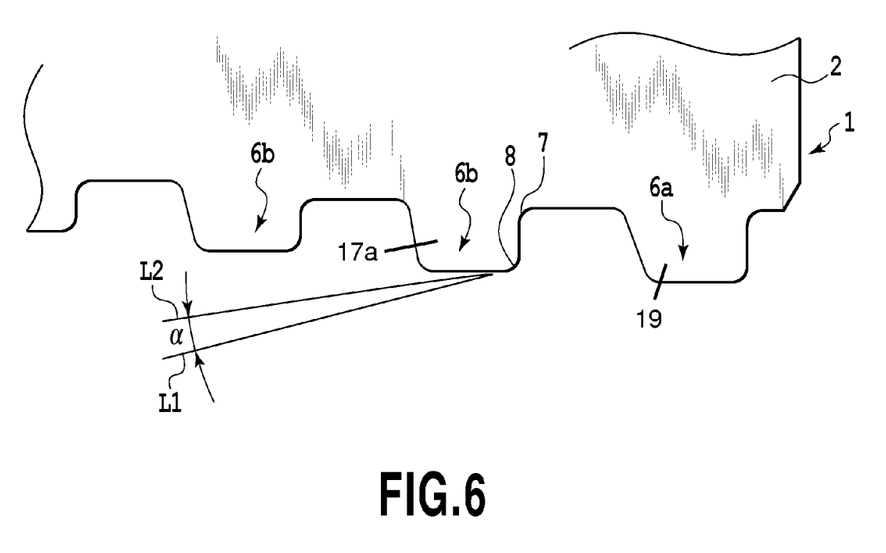
FIG. 6 is a plan view diametrically showing a key part of the cutting insert shown in FIG. 3.

FIG. 3 is a plan view showing the cutting insert for threading work shown in FIG. 1 as viewed from an upper face side. FIG. 4 is a left side view showing the cutting insert for threading work shown in FIG. 1 as viewed from a left side. The right side view is omitted in illustration. FIG. 5 is an enlarged view of a cross section of lines V-V in FIG. 3. FIG. 6 is a diametrical plan view showing a key part of the cutting insert for threading work shown in FIG. 3.

A cutting insert 1 for threading work (hereinafter, described as "cutting insert 1" for short) according to the present embodiment is formed in a substantially rectangular plate shape as shown in FIG. 1 to FIG. 3, and a has a cutting side face 14, a leading side face 12L, a rearward side face 12R, and a back side face 12B. A tool material of the cutting insert is selected out of a hard material of cemented carbide, cermet, ceramic or the like, or an element formed by coating a PVD or CVD coating film on a surface of the hard material. An upper face of the cutting insert 1 forms a rake face 2. In the present embodiment, the rake face 2 is formed in a flat face. It should be noted that in another embodiment in which a chip breaker is provided on an upper face of a cutting insert to be described later, the rake face is not necessarily the upper face itself, but an inclination face formed in the nearest position to the cutting edge forms the rake face. A lower face of the cutting insert 1 forms a seating face 3, and the seating face 3 forms part of a contact face when the cutting insert 1 is removably mounted to a indexable insert holder or the like. It should be noted that in anther embodiment in which any device on a shape is made on the lower face, a section in the lower face actually making contact with the tool holder forms part of the seating face. The flank is formed on at least one cutting side face from among the side faces in the cutting insert 1.

A plurality of tooth-shaped cutting edges are formed in a cross ridge line portion between the rake face 2 and the flanks as viewed from an upper side of the rake face 2. An arrow F in each of FIGS. 1 to 3 indicates a relative feeding direction of the cutting insert 1 to a work piece, while 10R shows the most back side in the relative feeding direction and 10L shows the most front side in the relative feeding direction. The cutting edges are formed on a set of teeth including roughing teeth 17a, 17b, 17c and 17d and a finishing tooth 19. As seen in the upper view of FIG. 3, each tooth has a crown portion 19a, an inclined portion 19b, a bottom portion 19c which connects to an adjacent tooth, and a trailing portion 19d (portions indicated for tooth 19 only). As seen in FIG. 3, relative to an internal reference line Ri that is parallel to the relative feed direction F, the tooth heights h4, h3, h3, h1 and h0, which correspond to teeth 17d, 17c, 17b, 17a and 19, respectively, increase in the rearward direction R opposite to the relative feed direction F. The finishing cutting edge 6a is structured by a series of cutting edges between a last tooth 19 arranged in the most back side 10R in the feeding direction F, a bottom portion adjacent thereto and arranged in the backside in the feeding direction F, and a bottom portion to a cutting edge of the adjacent tooth 17a. The finishing cutting edge 6a is the cutting edges which are pushed into a work piece and transfer a shape of the screw therein at the time of performing finish work of a screw to the work piece. Since a range of the cutting edges in the finishing cutting edge 6a is required to include an entire range in which the shape of the screw is transferred, the range is defined as the extent to the bottom portion adjacent to both the sides of the teeth. In the present embodiment, the finishing cutting edge 6a is principally formed by a single tooth 19.

Since it is required to perform roughing cutting work to a screw before being subjected to finish work by the finishing cutting edge 6a, roughing cutting edges 6b pushed into a work piece to involve the roughing cutting work are formed in the cutting insert 1. In the present embodiment shown in FIGS. 1 to 5, the roughing cutting edges 6b are formed with four teeth 17a, 17b, 17c, 17d.

A flank 4a extending from the finishing cutting edge 6a and a flank 4b extending from the roughing cutting edge 6b respectively form a flank which is inclined gradually inside according to approaching the seating face 3, having a so-called positive clearance angle. The rectangularly plate-shaped insert 10 has a peripheral side surface including a cutting side face 14, a back side face 12B, a leading side face 12L and a rear side face 12R which is closest to the finishing tooth 19 and the finishing cutting edge 6a. The side faces 12L, 12R and 12B are non-cutting faces and are not involved in cutting, while cutting side face 14, in which the plurality of teeth 17a-17d and 19 and tooth-shaped cutting edges are formed, is involved in cutting. Therefore each of these three non-cutting faces 12L, 12R, 12B generally does not have cutting edges and so forms a flank having a clearance angle of zero degrees as viewed in a cross section in a normal direction of each side face. However, two of the three non-cutting side faces may serve as a positioning reference when the cutting insert 1 is removably installed in the edge replacement insert holder or the like. Which two faces among the three non-cutting side faces are used as the side faces for the positioning reference depends on the edge replacement insert holder to be used or the like. Generally the back side face 12B which opposes the cutting side face 14 (which has the plurality of the cutting edges and cutting teeth) and the non-cutting rearward side face 12R including a section near the finishing cutting edge 6a are defined as the side faces for the positioning reference.

In the embodiment shown in FIG. 1 to FIG. 4, one set of cutting edges are structured by the one finishing cutting edge 6a and the four roughing cutting edges 6b as described above. Relative to the internal reference line Ri, each of the roughing teeth 17a-17d has a smaller height than the finishing tooth 19, when viewed from an upper side of the rake face 2, to leave uncut a portion of a work piece which is then cut later on by the finishing cutting edge 6a. Since a plurality of the roughing cutting edges 6b are provided in the cutting insert 1 in the present embodiment, the teeth 17a-17d of the roughing cutting edges 6b become gradually smaller toward a front side 10F in the feeding direction F. By doing so, the removal allowance of each roughing cutting edge 6b is appropriately distributed. In addition, by doing so, cutting loads which the four roughing cutting edges 6b respectively bear are dispersed. The cutting loads to the respective roughing cutting edges 6b are reduced, and thereby, tool damages are suppressed to extend a tool lifetime of the cutting insert 1. It should be noted that adjustment of a size of the teeth in the roughing cutting edge 6b may be made by changing a height of the teeth 17a-17d as shown in FIG. 1 to FIG. 4 or may be made by another method (for example, more complicated shape). As another embodiment of a cutting insert for threading work in the present invention, it is possible to adopt a cutting insert for threading work equipped with a plurality of finishing cutting edges 6a. In a case of performing cutting work of a screw to a work piece, since one set of the finishing cutting edge 6a and the roughing cutting edge 6b respectively processes the screw in order. Therefore, an aging change in work accuracy degradation of the screw to be processed is suppressed by increasing the numbers of the finishing cutting edges 6a.

In the present embodiment, the rake face 2 is formed as a substantially flat face, but a chip breaker groove may be formed along the cutting edges (finishing cutting edge 6a and roughing cutting edge 6b). The chip breaker at this time is not only of a groove type, but also may be of a projection type or a rising wall face type called a step type (not shown).

The flank 4a of the finishing cutting edge 6a generally has a substantially flat face shaped by grinding work using a grinding stone. In the present embodiment, as viewed in a direction of an enlarged cross section in FIG. 5, the flank 4a of the finishing cutting edge 6a includes a first flank 5a, and a second flank 5b having a clearance angle θb larger than a clearance angle θa of the first flank 5a. In FIG. 5, W indicates a formation range, or height, of the first flank 5a.

As viewed in a cross section of the finishing cutting edge 6a taken in a normal direction of the crown portion 19a of the tooth 19, the clearance angle θa of the first flank 5a in the crown portion is preferably in a range of 2° to 15°. If the clearance angle θa of the first flank 5a is smaller than 2°, since the clearance angle is not sufficient, progress of the flank wear becomes fast, thereby generating a problem of the tool lifetime. If the clearance angle θa of the first flank 5a is larger than 15°, since a cutting angle in the vicinity of the cutting edge becomes insufficient, the cutting edge is low in strength, leading to easy generation of abnormal damages such as chipping or fracture.

In the cutting insert 1 according to the present invention, a flank extending from the cutting edge of the crown portion 19a of the tooth (crown portion 19a of tooth 19 indicated in FIG. 3) touches to a trough bottom of a screw groove to be processed, a flank extending from an inclination portion (inclination portion 19b of tooth 19 indicated in FIG. 3 shown) of the tooth shaped cutting edge touches to the flank of the screw, and a flank extending from the bottom portion between the cutting edges of adjacent teeth (bottom portion 19c between tooth 19 and adjacent tooth 17a indicated in FIG. 3) touches to a peak of the screw groove. The various flanks may not have the same clearance angle, but the clearance angle may change in each of the flanks. This is because in the respective flanks described before, the clearance angles are not necessarily required to have the same angle in consideration of interference with a surface of a work piece. However, in regard to the flank provided in the cutting edge portion in which a section of the corresponding screw groove is the same in either the roughing cutting edge 6b or the finishing cutting edge 6a, the same degree of the clearance angle is preferably set in the first flank 5a and the second flank 5b.

It should be noted that in a case where a clearance angle is generally formed in a threading cutting insert, the threading cutting insert is inclined in a normal direction of a crown portion of a thread to grind the flank. In this case, the clearance angle to be formed is maximized in a normal direction of the crown portion of the thread, and the clearance angle as viewed in a normal direction of the cutting edge different from this direction is made small.

As shown in a hatched line in FIG. 2, the first flanks 5a are formed to be connected in an entire region of the finishing cutting edge 6a. The first flank 5a is formed to the halfway of the flank 4a in a thickness direction of the cutting insert 1 (in the direction from rake face 2 to the seating face 3) in the present embodiment. In the present embodiment, a part of the first flank 5a is formed to extend to the seating face 3 of the lower face, but may be not necessarily required to extend to the seating face 3, and in another embodiment, all the first flanks 5a may be formed to the halfway of the flank 4a. The second flank 5b having the clearance angle larger than that of the first flank 5a extends to the seating face 3 of the lower face. That is, the finishing cutting edge 6a, the first flank 5a and the second flank 5b are provided to be connected in that order from the rake face 2 toward the lower face as the seating face 3. The second flank 5b in the present embodiment is formed in a substantially flat shape, but not limited thereto, may be formed in a complicated shape by a combination of curved faces or a plurality of faces. In a case of forming the second flank 5b with a curved face, an angle between a tangential plane in any position of the second flank 5b and the rake face 2 is preferably made smaller than an angle between the flank 4b of the roughing cutting edge and the rake face 2. As the second flank 5b is formed in this way, a chatter vibration in the middle of the cutting work is suppressed to improve a surface roughness of the worked face.

Next, an explanation will be made of a manufacturing method of the cutting insert for threading work according to the present invention. The cutting insert for threading work in the present invention is formed to a desired final shape by performing the grinding work using a grinding stone to a material made of a hard sintered body of cemented carbide, cermet or ceramic, for example. Conversely the above material is formed to a shape estimating a grinding allowance to a desired final shape by powder pressure forming, sintering or the like.

Hereinafter, an explanation will be made only of the processes of performing the grinding work for the cutting edges (finishing cutting edge 6a and roughing cutting edge 6b), the rake face 2 and each flank among the processes of the grinding work. An explanation in regard to the grinding work to portions other than the above portions is omitted because of no difference in the manufacturing method of the cutting insert for threading work in the present invention from the conventional manufacturing method of the insert and no relationship to the explanation of the present invention.

Firstly grinding work is performed on an upper face of a material to form a rake face made of a flat face. It should be noted that a chip breaker groove may be in advance formed on the upper face of the material. In this case, the upper face of the material becomes the rake face 2, and the grinding work to the rake face 2 is not necessarily required.

The second flank 5b can be formed by grinding work, but may be formed by powder pressure forming and sintering. In a case where the second flank 5b is formed by powder pressure forming and sintering, the cutting insert for threading work according to the present invention can largely reduce the manufacturing costs. However, for easy understanding of the explanation in the following, an explanation will be made only of an embodiment of performing grinding work to the second flank 5b, and an explanation of an embodiment of forming the second flank 5b by power pressure forming and sintering is omitted.

In the cutting insert according to the present embodiment, the flanks 4a and 4b are processed by two separate processes of rough grinding and finish grinding. In the rough grinding, the second flank 5b is formed on the flank of each of the roughing cutting edge 6b and the finishing cutting edge 6a. The second flank 5b may be rougher in surface roughness than the first flank 5a. For example, when the surface roughness is indicated at a calculation average roughness Ra (ISO•4287-1997, and JIS•B0601-2001), Ra is preferably in a range of more than 0.20 μm to 0.80 μm. Therefore in the rough grinding, a grinding stone for roughness work can be used, which places a grinding efficiency ahead of the shape accuracy of the cutting edge or the surface roughness of the flank. A large part of the flank 4b in the roughing cutting edge is structured only by the second flank 5b by rough grinding. That is, a large part of a cutting edge ridge line of the roughing cutting edge 6b can be formed as a cross ridge line between the second flank 5b and the rake face 2.

It should be noted that in a case where Ra is equal to or less than 0.20 μm, the surface roughness is the same as that of the conventional insert, and there is no problem on use thereof. In the present embodiment, for realizing an object of manufacturing the cutting insert at low costs, the condition that Ra should be equal to or less than 0.20 μm is not required and a grinding efficiency of rough grinding is improved. On the other hand, in a case where Ra exceeds 0.80 μm, the cutting edge accuracy of the roughing cutting edge 6b is deteriorated, leading to easy generation of abnormal damages such as chipping.

The flank 4a of the finishing cutting edge is formed through rough grinding and finish grinding. That is, the second flank 5b by the rough grinding is partly or all cut out by the subsequent finish grinding. The second flank 5b formed in the flank 4a of the finishing cutting edge is formed leaving the grinding allowance to a final shape of the flank 4a of the finishing cutting edge. In the rough grinding, the grinding efficiency takes precedence, and for example, it is preferable to use a form grinding stone which can grind and process a plurality of tooth-shaped cutting edges simultaneously. Without mentioning, the plurality of the tooth-shaped cutting edges may be individually grinded and processed one by one.

In the finish grinding as the next process to the rough grinding, the first flank 5a is formed in the flank 4a of the cutting edge including an entire region of the finishing cutting edge 6a of finishing tooth 19 and in the flank 4b of the adjacent roughing cutting edge associated with tooth 17a. In the finish grinding, a grinding stone for finishing cutting work is used, which is superior to the grinding stone used in the rough grinding in terms of the shape accuracy or the surface roughness after being processed. For example, when the surface roughness is indicated at a calculation average roughness Ra, considering that Ra is required to be equal to or less than 0.20 μm, and the manufacturing costs, Ra is preferably equal to or more than 0.10 μm. The first flank 5a is intersected with the rake face 2, and a cutting edge ridge line including an entire region of the finishing cutting edge 6a is formed in the cross ridge line portion. It should be noted that in the present embodiment, the first flank 5a is connected to the entire region of the finishing cutting edge 6a, but is not formed in an entire region of the flank 4a. Therefore a part of the second flank 5b formed by the rough grinding is left to be spaced from the finishing cutting edge 6a. As a result, the grinding allowance of the first flank 5a is appropriately adjusted to enable the time for grinding work to be shortened and reduce manufacturing costs of the cutting insert for threading work.

A formation range W of the first flank 5a in FIG. 5 is preferably formed in a range of 0.5 mm to 5 mm in the thickness direction of the cutting insert from the finishing cutting edge 6a. As the formation range W is formed in a range of 0.5 mm to 5 mm, the load on the grinding stone performing the grinding work to the first flank 5a is reduced and the time required for the grinding work to the first flank 5a is shortened. Thereby manufacturing costs for the cutting insert can be reduced. In addition, the lifetime of the grinding stone for performing the grinding work to the first flank 5a can be extended. Further, because of less wear of the grinding stone, the shape accuracy of the finishing cutting edge 6a can be enhanced.

As the formation range W of the first flank 5a is made to a length of exceeding 5 mm from the finishing cutting edge 6a, an effect of the grinding allowance elimination is lost, and the manufacturing costs can not be reduced. It should be noted that in a case where a length of the entire side face as the flank is equal to or less than 5 mm from the cutting edge ridge line, as shown in FIG. 2 a part of the first flank 5a may be formed to reach the seating face 3. In reverse, as the formation range W comes to a length of less than 0.5 mm from the cutting edge ridge line, when the flank wear in the finishing cutting edge 6a exceeds a length of the first flank 5a, deterioration in shape accuracy of a work screw rapidly progresses due to the flank wear. Therefore when the tool lifetime is determined based upon the shape accuracy of the screw to be processed, there occurs a problem that the tool lifetime is shortened.

The clearance angle of the second flank 5b is made slightly larger than the clearance angle of the first flank 5a, preferably is made larger in a range of 1° to 10°. If the difference in the clearance angle is smaller than 1°, it is difficult to leave the second flank 5b without a fail, and manufacturing variations in the position of a boundary line between the first flank 5a and the second flank 5b become large. If the difference in the clearance angle exceeds 10°, the grinding allowance of the first flank 5a comes to be largely left, thus losing the effect of the reduction in the manufacturing costs. It should be noted that when the clearance angle of the first flank 5a is close to 15° as the aforementioned upper limit value, the difference in the clearance angle is preferably set to be in a range of 1° to 3°. As described above, since a large part of the roughing cutting edge 6b is formed as the cutting edge by the second flank 5b, as the clearance angle of the second flank exceeds 15°, abnormal damages such as chipping or fracture tend to be easily generated.

As shown in FIG. 4 and in FIG. 5, as viewed from a cross section of the tooth 19 and the finishing cutting edge 6a in a normal direction of a crown portion thereof, the first flank 5a and the second flank 5b intersect to form an obtuse angle to project outside. A straight line extending from the surface of the first flank 5a is inclined outside without interference with the surface of the second flank 5b. Therefore the first flank 5a can be subjected to grinding work using the grinding stone without interference with the second flank 5b. With a provision of the second flank 5b, it is possible to shorten the time for the grinding work of the first flank 5a to reduce the manufacturing costs of the cutting insert.

The flank 4b of the roughing cutting edge 6b has at least one of the first flank 5a and the second flank 5b. As described above, the surface roughness of the second flank 5b may be rougher than that of the first flank 5a. Accordingly even in a case of forming the second flank 5b by grinding work, the second flank 5b can be formed with high efficiency by a grinding condition, for example, an increase in feeding speeds. In addition, a grinding stone rough in abrasive grain for roughing cutting work may be used. As described above, the second flank 5b may be formed by grinding work, but may be formed by powder pressure forming and sintering.

As described above, the finishing cutting edge 6a is a cutting edge which, when a complete screw is processed on a work piece, is pressed into the complete screw to function in such a manner as to transfer a shape of the cutting insert for threading work. As shown in FIGS. 2 and 6, an end portion extending to a side of the roughing cutting edge of the first flank 5a is not formed in the finishing cutting edge 6a, and extends past a boundary portion 7 between the finishing cutting edge 6a and the roughing cutting edge 6b into the roughing cutting edge 6b of the adjacent roughing tooth 17a. Thus, the end portion 8 serves as the end portion of the first flank 5a and, at the same time, serves as the start portion of the second flank 5b. In this case, it is preferable that, as viewed from an upper side of the rake face 2, a first tangential line L1 of a first cross ridge line portion between the first flank 5a and the rake face 2 in the end portion 8 extending to the side of the roughing cutting edge of the first flank 5a is inclined toward an outside of the threading cutting insert to a second cross ridge line portion between the second flank 5b and the rake face 2 in the end portion 8. When this inclination angle is indicated at an angle α between a second tangential line L2 of the second cross ridge line portion between the second flank 5b and the rake face 2 in the end portion 8 and the first tangential line L1, the inclination angle α is preferably in a range of 1° to 3°. Here, it is understood that both tangential lines L1, L2 begin in end portion 8.

When the inclination angle α is smaller than 1°, it is difficult to certainly leave the second flank 5b, and manufacturing variations in a position of the boundary line between the first flank 5a and the second flank 5b become large. When the inclination angle α is larger than 3°, a probability of causing abnormal damages such as chipping or damages in a bend section generated in the end portion 8 at cutting work of a screw becomes high. When the inclination angle α is in a range of 1° to 3°, the bend section generated in the end portion 8 can not be sharp. Thereby since generation of partial tool damage is prevented in the end portion 8, it is possible to prevent the tool lifetime of the cutting insert for threading work from becoming short.

The screw to be processed by the threading cutting insert can be processed by the finishing cutting edge 6a formed by the first cross ridge line between the first flank 5a and the rake face 2 and having a high shape accuracy, thus maintaining the high shape accuracy. In addition, the shape accuracy of the finishing cutting edge 6a is ensured to the extent of the boundary portion 7 to the adjacent roughing cutting edge 6b, and therefore the cutting insert having the finishing cutting edge 6a with high accuracy by the grinding work can be provided. It should be noted that an amount, by which the first flank 5a extends past the boundary portion 7 between the finishing cutting edge 6a and the roughing cutting edge 6b and extends to a side of the roughing cutting edge 6b, is not limited particularly, but it is preferable to shorten this amount as much as possible in such a manner as not to increase the time required for the finish grinding. Generally, in the finish grinding, a form grinding stone for transferring a shape to the finishing cutting edge is used, but another method, for example, profile grinding or the like may be adopted.

The threading cutting insert as explained above is fed by a machine tool such as a lathe in a direction in parallel to a rotational center line or in a direction inclined at a predetermined angle to a work piece rotating around the rotational center line, and at least one set of the roughing cutting edge 6b and the finishing cutting edge 6a are sequentially pressed into an outer peripheral face or an inner peripheral face of the work piece to perform screw cutting work. After the four roughing cutting edges 6b arranged in a front side of the feeding direction F perform roughing cutting work of a screw ahead of the finishing cutting edge 6a, the single finishing cutting edge 6a arranged in a back side of the feeding direction F of the roughing cutting edge 6b performs finishing cutting work to the screw to be processed in a predetermined screw shape.

The present invention is not limited to the aforementioned embodiment, and modification, addition and elimination of components are possible as needed within the scope not departing from the subject of the present invention without mentioning. For example, the cutting insert for threading work exemplified includes one set of the roughing cutting edge and the finishing cutting edge, but can be modified to a type including a plurality of sets of roughing cutting edges and finishing cutting edges, that is, a so-called multiple corner type. The shape of a screw cutting edge of the cutting insert also can be appropriately modified corresponding to a desired shape. In addition, according to the present embodiment, the finishing cutting edge is structured by one tooth, but the finishing cutting edge may be formed by a plurality of teeth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1 Cutting insert for threading work
2 Rake face (upper face)
3 Seating face (lower face)
4a Flank of a finishing cutting edge
4b Flank of a roughing cutting edge
5a First flank
5b Second flank
6a Finishing cutting edge
6b Roughing cutting edge
7 Boundary portion between a finishing cutting edge and a roughing cutting edge
8 End portion of a cross ridge line portion between a first flank and a rake face
10L Most front side in relative feeding direction
10R Most back side in relative feeding direction
12B Back side face
12L Leading side face
12R Rearward side face
14 Cutting side face
17a-17d Roughing teeth
19 Finishing tooth
19a Crown portion of tooth
19b Inclination portion of tooth
19c Bottom portion of tooth
19d Trailing portion of tooth
h0, h1, h2, h3, h4 heights of teeth relative to internal reference line
Ri Internal reference line for measuring heights of teeth
F Relative feeding direction of a cutting insert
θa Clearance angle of a first flank
θb Clearance angle of a second flank
W Formation range of a first flank
L1 Tangential line of a cross ridge line portion between a first flank and a rake face in an end portion of the cross ridge line portion between the first flank and the rake face as viewed from an upper side of the rake face
L2 Tangential line of a cross ridge line portion between a second flank and a rake face in an end portion of a cross ridge line portion between a first flank and the rake face as viewed from an upper side of the rake face
α Inclination angle of a tangential line L1 to a tangential line L2

What is claimed is:

1. A threading cutting insert in which a rake face is formed on an upper face, flanks as a cutting side face are formed between the upper face and a lower face opposing the upper face, and a plurality of tooth-shaped cutting edges are formed in a cross ridge line portion between the rake face and the flanks as viewed from an upper side of the rake face, wherein:
the plurality of tooth-shaped cutting edges comprises at least one finishing cutting edge for transferring a shape of a screw, and at least one roughing cutting edge smaller than the finishing cutting edge as viewed from an upper side of the rake face,
the flanks include a first flank having a first clearance angle, and a second flank having a second clearance angle larger than the first clearance angle, as the first and second flanks are viewed in a row direction of the plurality of tooth-shaped cutting edges, wherein the finishing cutting edge, the first flank, and the second flank are provided to be sequentially connected in that order from the upper face in a direction of the lower face, the first flank with its first clearance angle extends along a first cross ridge line portion formed at an intersection between the first flank and the rake face, the first cross ridge line portion extending along the entire finishing cutting edge, past a boundary portion between the finishing cutting edge and the roughing cutting edge, and along a trailing portion of the roughing cutting edge, and the second flank with its second clearance angle extends along a second cross ridge line portion formed at an intersection between the second flank and the rake face, the second cross ridge line portion extending along a crown portion of the roughing cutting edge, past the trailing portion of the roughing cutting edge in a feed direction (F) of the cutting insert.

2. The threading cutting insert according to claim 1, wherein as viewed in a cross section of the tooth shape in the finishing cutting edge in a normal direction of a crown portion thereof, a clearance angle of the first flank in the crown portion is in a range of 2° to 15°, and a clearance angle of the second flank is larger by a range of 1° to 10° than the clearance angle of the first flank.

3. A threading cutting insert having a feed direction (F), and comprising:

an upper face and an opposing lower face;
a rake face formed on the upper face;
a side face connecting the upper face and lower face;
a plurality of tooth-shaped cutting edges formed at an intersection between the rake face and the side face, the plurality of tooth-shaped cutting edges comprising at least one finishing cutting edge for transferring a shape of a screw, and at least one roughing cutting edge smaller than the finishing cutting edge as viewed from an upper side of the rake face; and
in a direction from the upper surface to the lower surface, the at least one finishing cutting edge, a first flank of the side face and a second flank of the side face are sequentially arranged, with the first flank forming a first angle and the second flank forming a second angle, in a row view of the tooth-shaped cutting edges; wherein:
at the intersection with the rake face, a first portion of the side face forms the first angle with the rake face, and a second portion of the side face forms the second angle with the rake face;
the first portion of the side face extends along the entire finishing cutting edge, past a boundary portion between the finishing cutting edge and the roughing cutting edge, and along a trailing portion of the roughing cutting edge; and
the second portion of the side face extends past the trailing portion of the roughing cutting edge, in the feed direction (F).

* * * * *